E. H. WAUGH.
SLITTING KNIFE FOR FISH DRESSING MACHINES.
APPLICATION FILED MAR. 3, 1920.

1,361,353.

Patented Dec. 7, 1920.
2 SHEETS—SHEET 1.

INVENTOR
Edward H. Waugh
BY
H.L. & O.L. Reynolds.
ATTORNEY

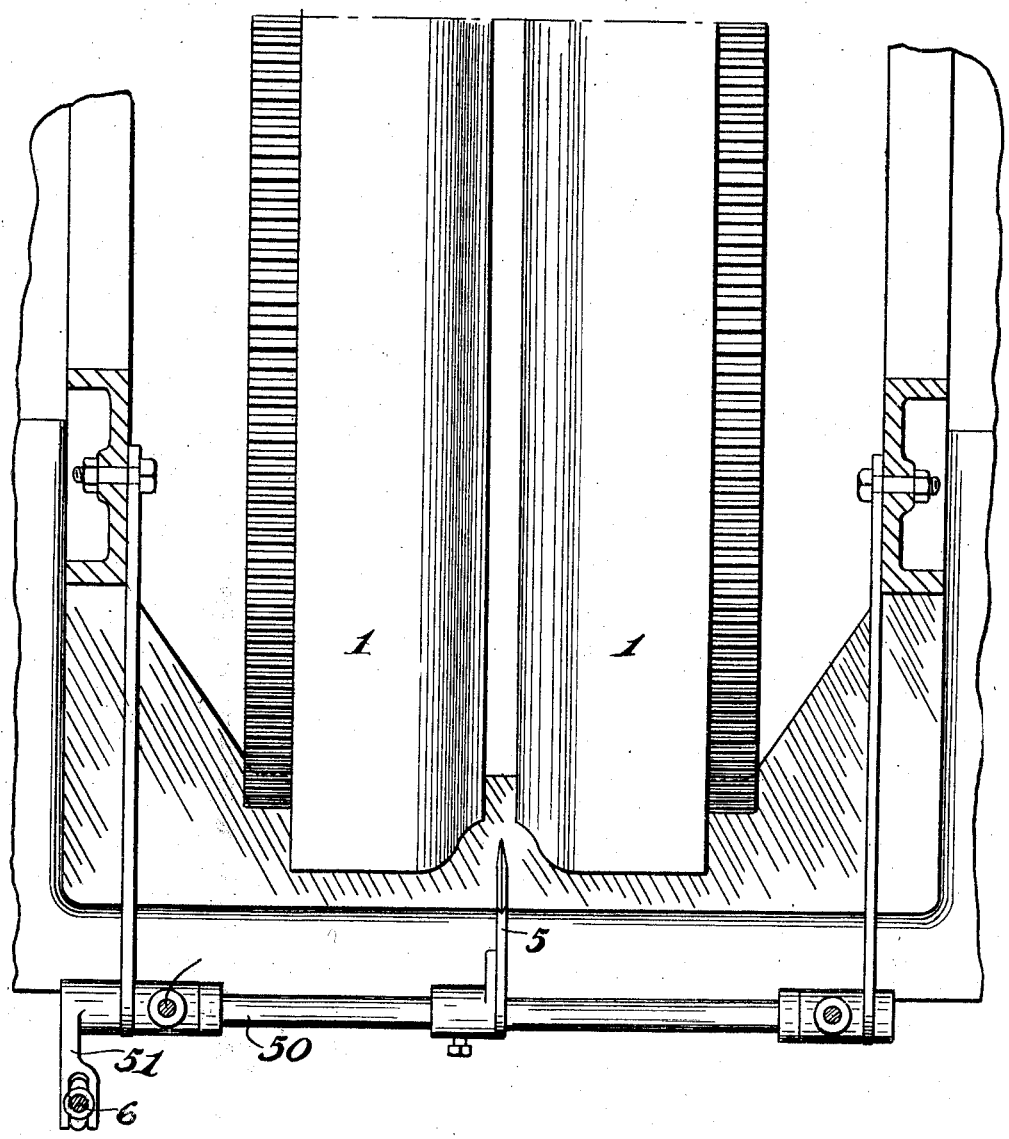

UNITED STATES PATENT OFFICE.

EDWARD H. WAUGH, OF SEATTLE, WASHINGTON.

SLITTING-KNIFE FOR FISH-DRESSING MACHINES.

1,361,353.  Specification of Letters Patent.  Patented Dec. 7, 1920.

Application filed March 3, 1920. Serial No. 362,997.

*To all whom it may concern:*

Be it known that I, EDWARD H. WAUGH, a citizen of the United States of America, and resident of the city of Seattle, county of King, and State of Washington, have invented certain new and useful Improvements in Slitting-Knives for Fish-Dressing Machines, of which the following is a specification.

My invention relates to an improvement in fish dressing machines and consists of an improvement in mechanisms employed for slitting certain portions of the fish and also for removing a strip thereof, said strip to include the backbone.

One object of my invention is to properly slit the tail end portion of fish, such as the cod, which are dried or cured in a flat condition. Another object is to combine such a slitting mechanism with a mechanism which acts to remove a section of the backbone, as from the vent to the head end.

The features of my invention which are new and upon which I desire to secure a patent will be hereinafter described and then particularly pointed out in the claims.

In the drawings I have shown my invention in the preferred form of construction.

Fig. 2 is a section of such a machine taken at about the point 2—2 of Fig. 1.

Figure 1:
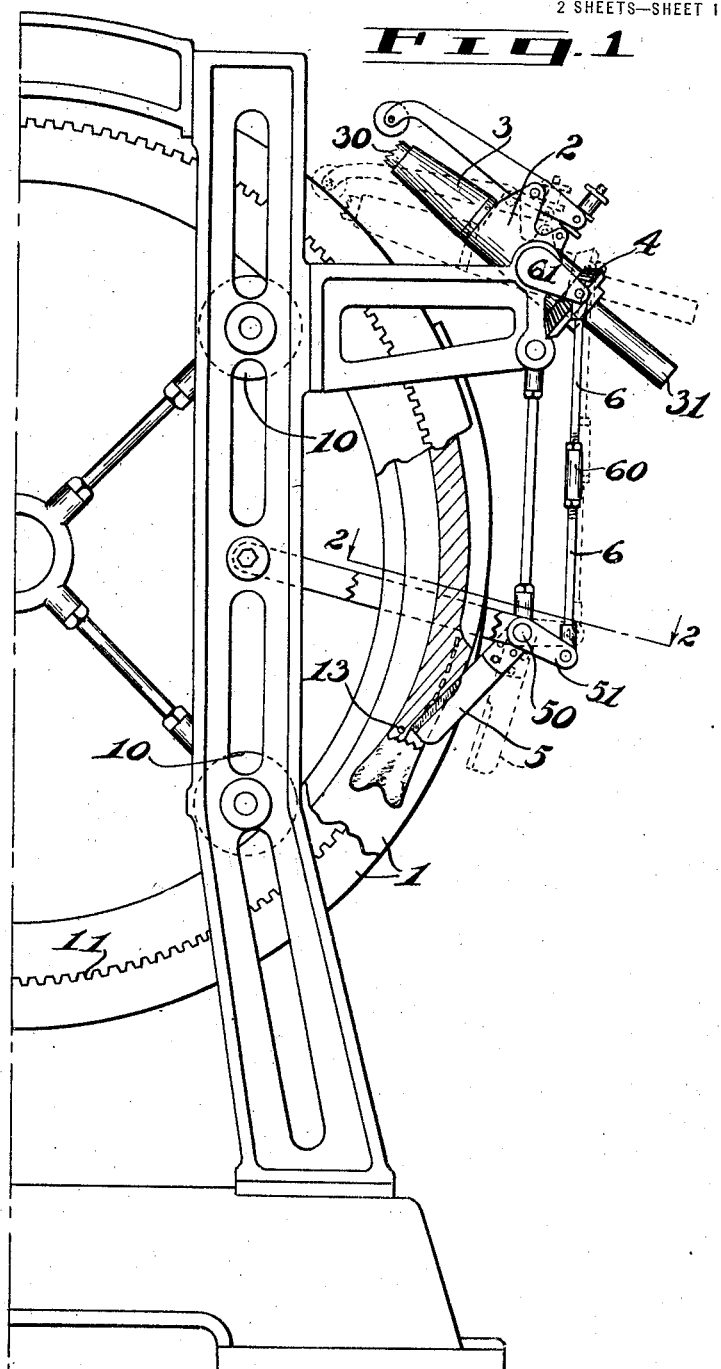
Figure 1 is a side elevation of a portion of a machine upon which my device has been mounted.

The machine upon which my device is herein shown is essentially the same as that shown in my prior application for Patent, Serial No. 336,819. In this machine the fish carrier consists of two rings, 1, mounted so as to turn about a common axis and spaced slightly apart so as to form a hollow or groove, into which the backs of the fish rest while being operated upon. These rings are shown as mounted upon rollers 10 so that they may be freely turned. Rotation is given to these rings through the action of a spur gear 11, which is engaged by a rotative gear. The particular type of carrier and its method of operation is to a certain extent immaterial. As the type of carrier may thus be varied I will herein claim the same only in the general terms of a carrier. It will suffice to say that means are employed whereby the fish are engaged and held in place upon the carrier while being acted upon. Such means as now contemplated include in part the use of pins 13 which are projected into the tail portion of the fish from the sides thereof.

Such means and the manner of their construction and operation are fully disclosed in said application, Serial No. 336,819, and also, varying only in details of construction, in the U. S. Patents to E. A. Smith, No. 998,129 of July 18, 1911 and No. 1,034,525 of August 6, 1912.

Mounted in suitable supports outside of the path of the carrier, is a tubular bearing member 2, in which is mounted for rotation a tubular cylinder 3. This is rotated through bevel gears, as 4, in any suitable manner. The rotative tube 3 is provided with a cutting member 30, in the form of a tubular ring which has its outer end notched or provided with cutting teeth. The rear projection 31 is a pipe which communicates with the rotative tubular member 3. There is thus provided an open passage-way extending throughout the length of this device. It is evident that if such a device as this, with a tubular cutter rotating, be lowered into such position as to engage the cutter with the fish in passing, it will cut therefrom a strip, which strip will be discharged through the tubular channel which ends with the pipe 31. In the aforesaid application, Serial No. 336,819 I have described means for operating a device of this sort to secure this result. It is, therefore, thought not to be necessary to describe the same in detail in this application.

Located at a point farther along the course of the carrier, is a slitting knife which is designed to slit that portion of the fish which is rearward of the point at which the action of the tubular cutter 30 begins. In preparation of fish such as cod, for which this machine has been especially designed, it is customary to remove that portion of the backbone which lies forwardly of the vent and to slit the portion of the body rearward of this a sufficient distance to enable the whole to be laid out flat, so that even drying may be secured. The purpose of the slitter knife 5 which has been above referred to, is to slit this tail section of the fish. The knife 5 consists of a flat blade sharpened at the edge which is toward the carrier. It is pivoted, as at 50, so as to swing its free end toward and from the carrier. The shaft 50, upon which it is secured, has an arm 51 secured thereto by which it is rocked to thus swing the blade into the positions represented by the solid and dotted lines in Fig. 1. To secure this swinging action the arm 51 is connected by a rod composed of two end sections 6 and a central adjusting section 60 which connects the end sections by right and left hand threads, whereby the effective length of the rod may be adjusted. The upper end of this rod is connected with an arm 61 which is fixed to swing with the bearing frame 2 in which the tubular cutting knife and its parts are journaled. This latter knife is caused to oscillate between the positions shown by solid and dotted lines in Fig. 1, by a mechanism which is fully described in the application previously referred to. The rod 6 and the manner of connecting the slitter knife 5 with the knife 3 is such that when one of these parts is in engagement the other is out of engagement.

These two knives are so located with reference to each other and to the points occupied by successive fish upon the carrier that the tubular knife engages the fish at a median point of its length and cuts from thence to is head end, while the slitting knife 5 engages the tail end of the fish and cuts from thence to the point where the other knife began, thus cutting the tail section of the fish so that it may be folded out flat. It is evident that many of the details of this device may be changed without changing the essential principles and manner of operation.

What I claim as my invention is:

1. In a fish dressing machine, in combination, a fish carrier, a knife blade and means for automatically moving the blade to slit a selected portion of the fish in passing.

2. In a fish dressing machine, in combination, a fish carrier, a knife blade and means synchronized with the carrier to automatically move the knife into and out of engagement with the fish.

3. In a fish dressing machine, in combination, a rotative carrier provided with means for securing fish thereto, a slitting blade pivoted to swing toward and from the carrier, and means for automatically swinging this blade to engage and slit predetermined parts of the fish in passing.

4. In a fish dressing machine, in combination, a fish carrier, a knife blade, means for automatically moving the blade to slit a selected portion of the fish in passing, and means for adjusting the depth of cut of the knife.

5. In a fish dressing machine, in combination, a fish carrier, a knife adapted to cut a strip from the fish in passing, a second slitting knife, both said knives being mounted for movement toward and from the carrier, and a common means for producing said movement of the two knives.

6. In a fish dressing machine, in combination, a fish carrier, a knife adapted to cut a strip from the fish in passing, a second slitting knife, both of said knives being mounted for movement toward and from the carrier, and means for moving said knives at like times in opposite directions.

7. In a fish dressing machine, in combination, a fish carrier, a knife adapted to cut a strip from the fish in passing, a second slitting knife, both of said knives being mounted for movement toward and from the carrier, and means connecting said knives to actuate one from the other.

8. In a fish dressing machine, in combination, a fish carrier, a knife adapted to cut a strip from the fish in passing, a second slitting knife, both of said knives being mounted for movement toward and from the carrier, and means connecting said knives to move them together and in opposite directions relative to the carrier.

9. In a fish dressing machine, in combination, a fish carrier, a knife adapted to cut a strip from the fish in passing, a second slitting knife, both of said knives being mounted for movement toward and from the carrier, a slitting knife mounted to move toward and from the carrier and located farther along the path of the carrier than the first knife, and means for moving both of said knives into and out of cutting position and in opposite relation.

10. In a fish dressing machine, in combination, a fish carrier, a strip-removing knife and a slitting knife, said knives being located at separated positions along the course of the carrier and means for moving said knives into and out of engagement with the fish at respectively different points in the length of the fish.

11. In a fish dressing machine, in combination, a fish carrier, a tubular knife and means for rotating it, said knife being mounted for movement in the plane of the carrier to engage the fish and remove a strip containing the backbone, a slitter blade mounted for movement into and out of engagement with the central line of the fish, and means for moving said knives into and out of engagement with the fish to remove the major forward part of the back bone by the tubular knife and to slit the remaining rearward part of the fish with the slitter knife.

12. In a fish dressing machine, in combination, a fish carrier, a tubular knife and means for rotating it, said knife being mounted for movement in the plane of the carrier to engage the fish and remove a strip containing the backbone, a slitter blade mounted for movement into and out of engagement with the central line of the fish, and means for moving said knives into and out of engagement with the fish to remove the major forward part of the back bone by the tubular knife and to slit the remaining rearward part of the fish with the slitter knife, said knives being connected to move together but in opposite directions relative to the fish.

Signed at Seattle, King county, Washington this 24th day of February, 1920.

EDWARD H. WAUGH.